United States Patent [19]
Ludwig

[11] Patent Number: 5,597,426
[45] Date of Patent: Jan. 28, 1997

[54] TIRES FOR VEHICLES

[76] Inventor: Dieter Ludwig, Föhrenweg 10, CH-4460 Gelterkinden, Switzerland

[21] Appl. No.: 67,369

[22] Filed: May 26, 1993

[30] Foreign Application Priority Data

May 26, 1992 [CH] Switzerland .................... 01697/92

[51] Int. Cl.⁶ .................... B60K 9/18; B60K 9/24
[52] U.S. Cl. ................ 152/200; 152/197; 152/198; 152/526
[58] Field of Search .................. 152/192–194, 152/197–200, 526, 530, 527

[56] References Cited

U.S. PATENT DOCUMENTS

| | | | |
|---|---|---|---|
| 1,428,726 | 9/1922 | Warth | 152/530 X |
| 1,460,599 | 7/1923 | Nicholson | 152/530 X |
| 2,516,415 | 7/1950 | Puma | 152/530 X |
| 3,083,749 | 4/1963 | Destinay et al. | 152/526 X |
| 3,667,529 | 6/1972 | Mirtain | 152/527 |
| 3,785,423 | 1/1974 | de Carbon | 152/527 |
| 3,786,851 | 1/1974 | Mirtain et al. | 152/527 |
| 3,794,097 | 2/1974 | Kind | 152/527 |
| 4,011,899 | 3/1977 | Chamberlin | 152/527 |
| 4,111,249 | 9/1978 | Markow | 152/530 X |
| 4,165,403 | 8/1979 | Alban | 152/526 X |
| 4,628,977 | 12/1986 | Ogino et al. | 152/527 X |
| 4,733,708 | 3/1988 | Kindry et al. | 152/527 |
| 5,201,971 | 4/1993 | Gifford | 152/526 X |

FOREIGN PATENT DOCUMENTS

| | | |
|---|---|---|
| 0191124 | 8/1986 | European Pat. Off. . |
| 0264539 | 4/1988 | European Pat. Off. . |
| 0320705 | 6/1989 | European Pat. Off. ............. 152/526 |
| 0357826 | 3/1990 | European Pat. Off. . |
| 0394536 | 10/1990 | European Pat. Off. ............. 152/526 |
| 0409120 | 1/1991 | European Pat. Off. ............. 152/526 |
| 0432127 | 6/1991 | European Pat. Off. ............. 152/526 |
| 1347506 | 11/1963 | France ............. 152/526 |
| 1433298 | 2/1966 | France ............. 152/526 |
| 1191702 | 4/1965 | Germany ............. 152/200 |
| 2355489 | 5/1975 | Germany ............. 152/526 |
| 3640222 | 6/1987 | Germany ............. 152/526 |
| 3738078 | 5/1989 | Germany . |
| 4113904 | 4/1992 | Japan ............. 152/526 |

*Primary Examiner*—Adrienne C. Johnstone
*Attorney, Agent, or Firm*—Jordan and Hamburg

[57] ABSTRACT

The tires for vehicles possess under their tread a belt which extends in the circumferential direction. At least one, preferentially two, layers contain, as strengthening and stabilizing means, foils or sheets with direction-dependent rigidity, which possesses its highest value in a preferred direction. The foils or sheets are so arranged that the preferred direction is oblique to the circumferential direction. Preferentially, the direction-dependent rigidity is realized with a waving or crimping. Through this alignment, which is arranged oblique to the tire circumference, the stabilizing effect of the waving is seen in both the longitudinal as well as the oblique directions. Thus, in comparison with the usual belted tires, less material is needed in tire production, and these tires are both light, but nevertheless possess good driving characteristics and superb rolling resistance.

26 Claims, 4 Drawing Sheets

TIRES FOR VEHICLES

BACKGROUND OF THE INVENTION

The invention applies to a tire for vehicles and a procedure for its manufacture.

It is known that most vehicles today use the so-called belted tire, whose usual method of construction is a casing with radially-, that is, perpendicular to the tire circumference, running cord threads and a belt with many, mostly crosswise-arranged, cords situated between the casing and tread.

A principal requirement of tire construction is the concurrent attainment of enough of both the transverse as well as the longitudinal stability of the tire in the appropriate proportions, as these factors decisively determine the characteristics of the driving dynamics. The well-known belted tires fulfill these specifications to a large degree.

However, today, in addition to the requirements for the best-possible handling, there is an increase in criteria for the economical use of energy and resources both in production and application. The energy consumption of a vehicle is influenced, not only by the air resistance and the weight of the entire vehicle, but also by tire characteristics such as weight, internal work, and rolling resistance. Moreover, it is not only cheaper and ecologically sounder to use less material in tire production, but it helps as well in the not unproblematical area of disposal.

In reference to the above-mentioned criteria, there are some burdensome disadvantages seen in the standard belted tires. The multi-layered cord fabric of the tire, together with its rubber casing, make a comparatively thick layer, which necessitates more material than would be desired. In addition, such a belt construction possesses a fundamentally insufficient rigidity in the radial direction, which impedes the formation of a symmetrical flat spot and specific load of the tire at the ground contact area. This obstacle is usually addressed using wider constructed radial tires, which produces the effect that the tire needs even more material, becomes heavier, and has increased coefficients of air resistance, internal work as well as rolling resistance.

SUMMARY OF THE INVENTION

It is an object of the present invention, to design a tire with a construction which is economical with respect to both energy and material, and which concurrently possesses the required longitudinal and transverse stability necessary for optimal handling, and at the same time enables the formation of a symmetrical flat spot and specific load of the tire at the ground contact area. In addition, the construction in accordance with this invention, should permit the accommodation of the tire parameter to the differing requirements of the tire, such as with regard to speed handling and comfort.

According to the invention, the solution to these problems follows from using a radial tire having at least two strengthening layers consisting of strengthening and stabilizing means embedded in an elastomeric material and overlying each other in at least one area. The strengthening and stabilizing means in at least one of the at least two strengthening layers include sheet material as foils or sheets with direction-dependent mechanical characteristics.

The utilization of strengthening and stabilizing means in the form of foils or sheets with direction-dependent mechanical characteristics, which possess an increased rigidity in a specific direction, allows the attainment of a high transverse stability with comparably little material. It is critical that the alignment of the chosen direction is oblique to the circumferential direction of the tire, as this affords, in addition to the transverse stability, the requisite longitudinal stability as well. An increase in layers to enhance the longitudinal stability thus becomes, in general, redundant. Experiments have shown that tires constructed in this manner are nevertheless still flexible enough to permit the formation of a symmetrical flat spot and specific load of the tire at the ground contact area. It is thus possible to manufacture tires which have an exceptional rolling resistance and are, nevertheless, narrower and lighter than tires produced according to the current standard of technology.

The direction-dependent rigidity of the foils or sheets can be brought about by various methods. Especially expedient are those types of embodiments by which the direction-dependent rigidity is achieved through a waving or crimping of the foil or sheet. However, it has become apparent that it is sufficient for tires, especially those which are optimized for lower driving stresses, that the material of the foils or sheets possesses a corresponding structural anisotropy or texture. Such an anisotropy comes about in some cases with synthetic material (plastic) foils such as with polyamide, whose fabrication procedures attain the longitudinal orientation of the molecular chains during the pre-extension in a calender, and which is accomplished with metal (such as steel) sheets through many manufacturing procedures, as, for example, by rolling, which produces the so-called texture.

Different parameters, such as comfort, rolling resistance or high-speed handling can be variably influenced with such a tire constructed according to this invention, by altering the angle between the specified direction in which the rigidity of the foil or sheet has its highest value and the circumferential direction. For example, sharper angles lead to an increased longitudinal stability, such that the rolling resistance can be further diminished and a so-called rolling bead in the running direction can largely be avoided.

Depending upon the purpose of utilization of a tire, for example, according to its speed category or vehicle weight, the number of layers and their appearance can be chosen accordingly. By preference, two layers of a radial tire are used, each having foils or sheets, whose respective specified direction runs with its highest rigidity opposed (mirrored) in relation to the tire's middle plane, as it is in this manner that the symmetrical running characteristics can most easily be achieved. The layers can also be of varying widths, or placed in such a way that they only partially overlap, which enables the belt to attain an increased flexibility of the marginal areas over the middle area.

It has become apparent that an additional advantage of using waved or crimped strengthening and stabilizing means is that the bonding between the foil or sheet and the elastomeric tire material is intensified with the waving or crimping.

BRIEF DESCRIPTION OF THE DRAWINGS

FIG. 1b is an enlarged detail of FIG. 1a.

FIG. 2b is a top view of the two layers seen in FIG. 2a.

DETAILED DESCRIPTION OF THE INVENTION

Figure 1A:
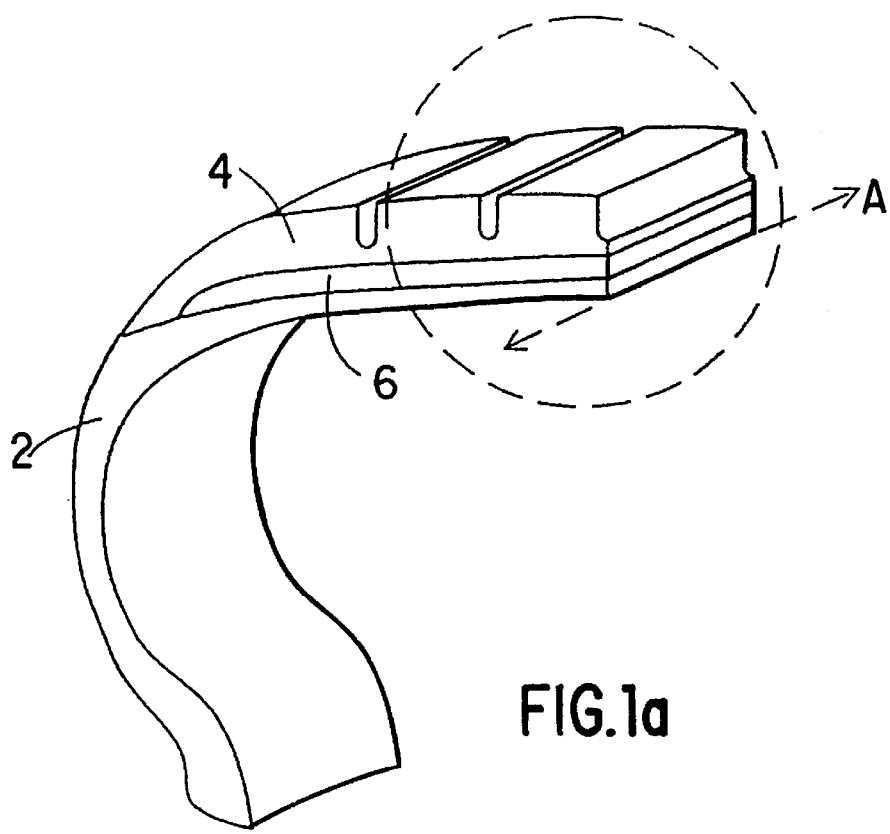
FIG. 1a is a simplified representation of a tire which has been cut open.
Figure 1B:
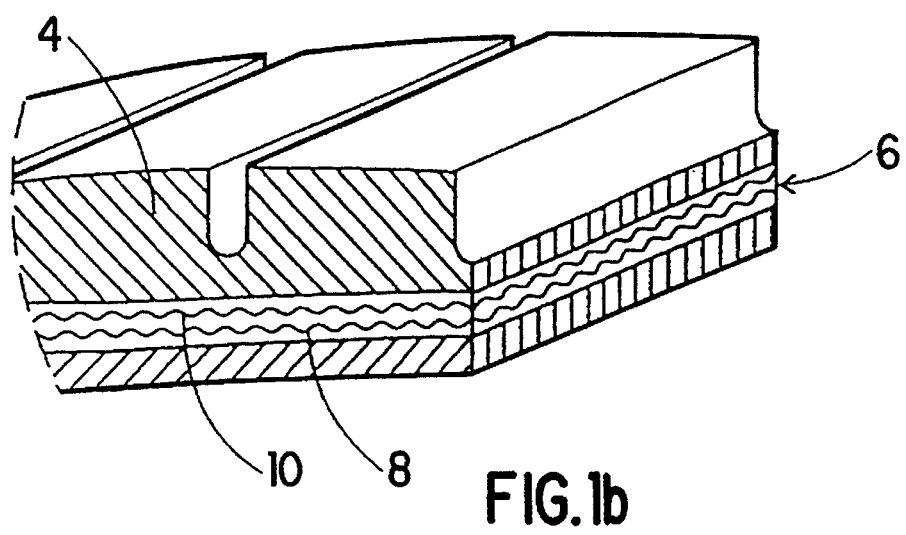

The simplified representation of a tire cut-out in FIG. 1a shows a carcass 2, a tread 4 and a ring-shaped belt 6 which extends in a circumferential direction under the tread. The circumferential direction is indicated by line A. The carcass 2, as well as the belt 6 and the tread 4, are composed of an elastomeric material. The belt 6 possesses, in the shown production type, two layers 8 and 10 with waved foils (or sheets) as strengthening and stabilizing means, which, in the enlarged detail (FIG. 1b) are depicted by wavy lines.

Figure 2A:
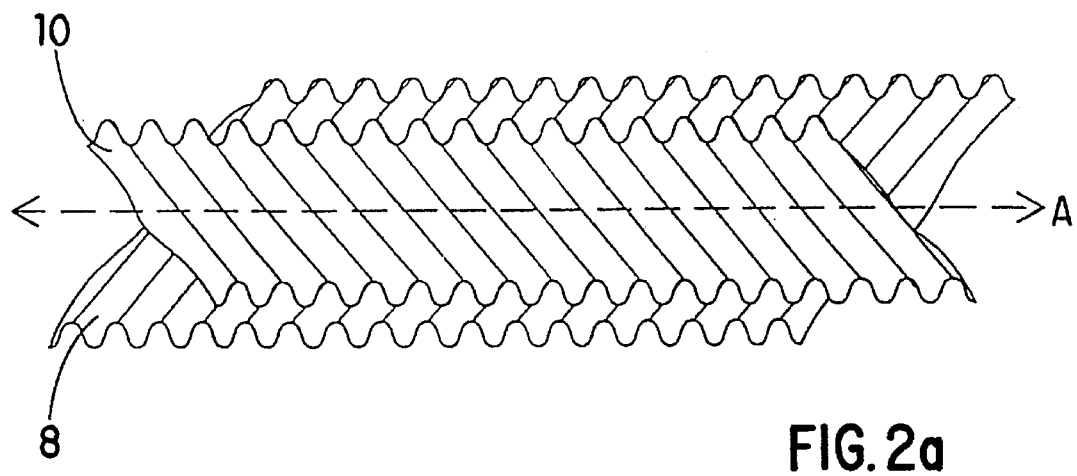
FIG. 2a is a schematic, perspective representation of a possible arrangement of two layers of a radial tire lying on top of each other, and possessing waved strengthening and stabilizing means.
Figure 2B:
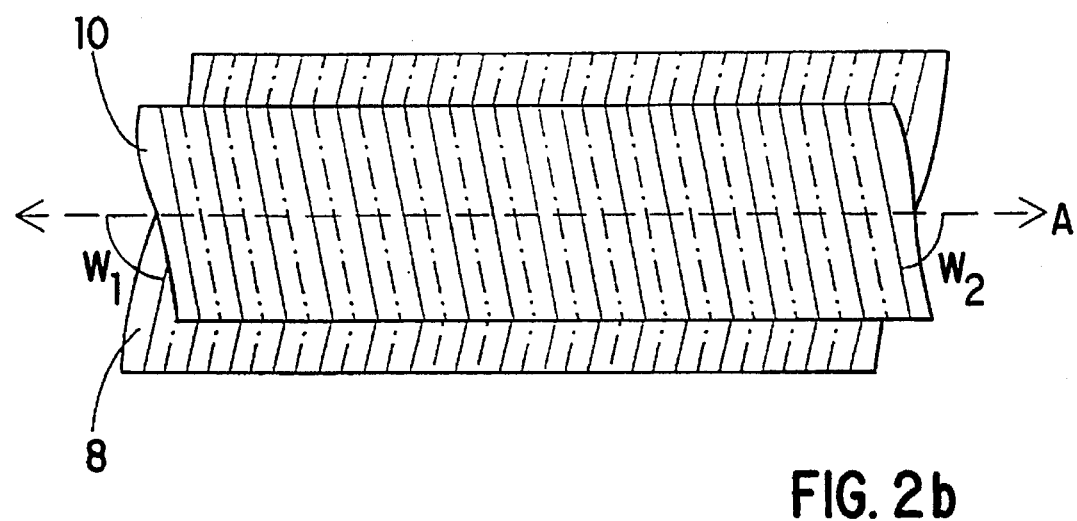

Both the layers 8 and 10 are schematically shown perspectively in FIG. 2a and from the top view in FIG. 2b. The orientation of the elevations or depressions of the foil runs longitudinally in both layers, oblique to the circumferential direction A, and in such a way that the lower layer 8 has a smaller supplemental angle $w_1$ and the upper layer 10 has a smaller supplemental angle $w_2$. The two angles can be of varying degrees. However, it is preferable that the elevations or depressions run in a direction opposite to that of the circumference, that is, that the smaller supplemental angles $w_1$ and $w_2$ are equally large, but arranged oppositely. There are no conclusive specifications which can be made about the amounts of the smaller supplemental angles as special requirements can be fulfilled on a certain tire by a corresponding special arrangement of the foils or sheets. As a rule, however, the angles move in a range of between 1° and 45°.

According to the diagrammed construction type, the foil of the lower layer 8 is wider than that of the upper layer 10. Both foils are arranged so that they lie over each other in the middle area of the belt, and in the side areas, it is only the tread of one foil which is efficacious; this provides the tire with a stiff inner region and a more flexible outer region. Depending upon the intended characteristics of the tire, a certain construction type with wider strengthening and stabilizing means in the upper layer can be just as expedient as a type in which both strengthening and stabilizing means are of the same size. In a corresponding manner, should the necessity arise, it is also possible to have more than two such layers configured in the belt.

Figure 3:
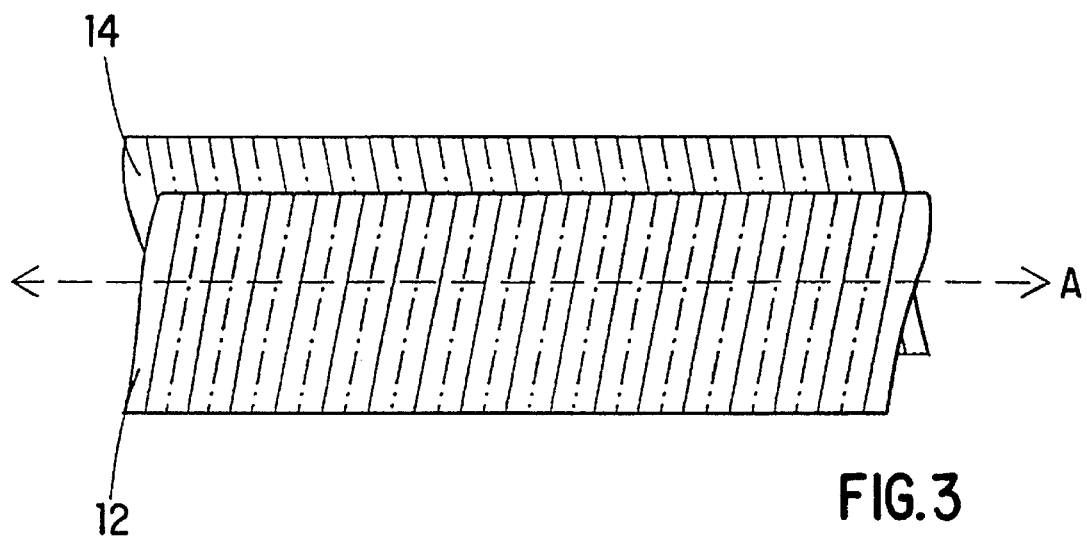
FIG. 3 is a top view of a further possible arrangement of two layers possessing waved strengthening and stabilizing means.
Figure 4:
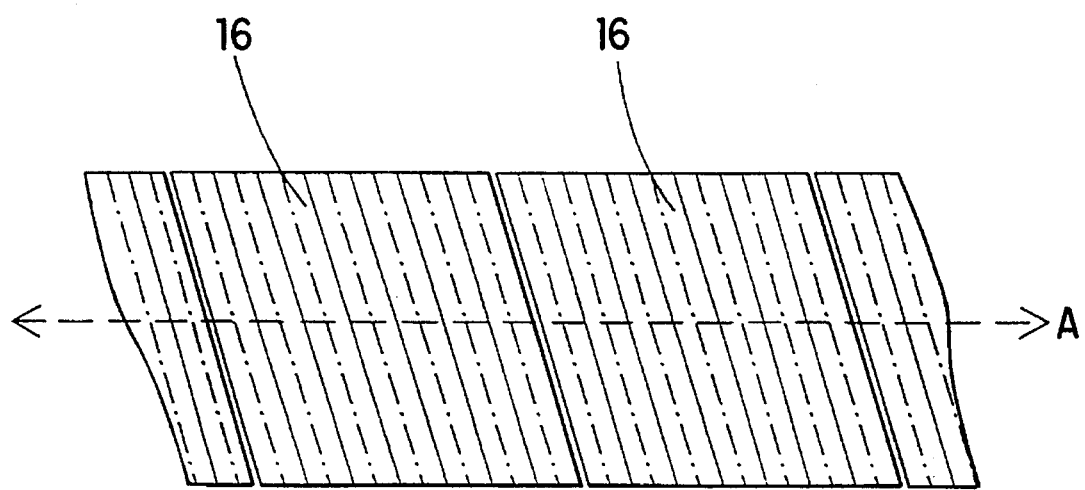
FIG. 4 is a top view of a layer whose strengthening and stabilizing means are composed of many lamellae-formed parts.

A further production type of a tire with a construction based on this invention is shown in FIG. 3, in which the two waved foils (or sheets) 12 and 14 are placed against each other so that they only overlie each other in the central region of the belt, and, in FIG. 4, it is shown that the foils must not necessarily be manufactured as one contiguous piece, but rather, according to use, can consist of a number of lamellae-formed parts 16 which can be positioned in a layer, either contiguously in direct apposition to each other or overlapped with each other, or noncontiguously with some distance between them.

Supplementary to the introductory general representation of the invention, it is once again underscored that one can achieve the direction-dependent mechanical characteristics of the foils or sheets not only by the described fabrication-type employing waving or crimping, but, in addition, it is possible to take advantage of a structural anisotropy of the material. The arrangement of the foils or sheets follows, analogously, in this case such that the preferred direction of highest rigidity of the alignment corresponds to the elevations and depressions depicted in FIGS. 2 to 4.

Figure 5:
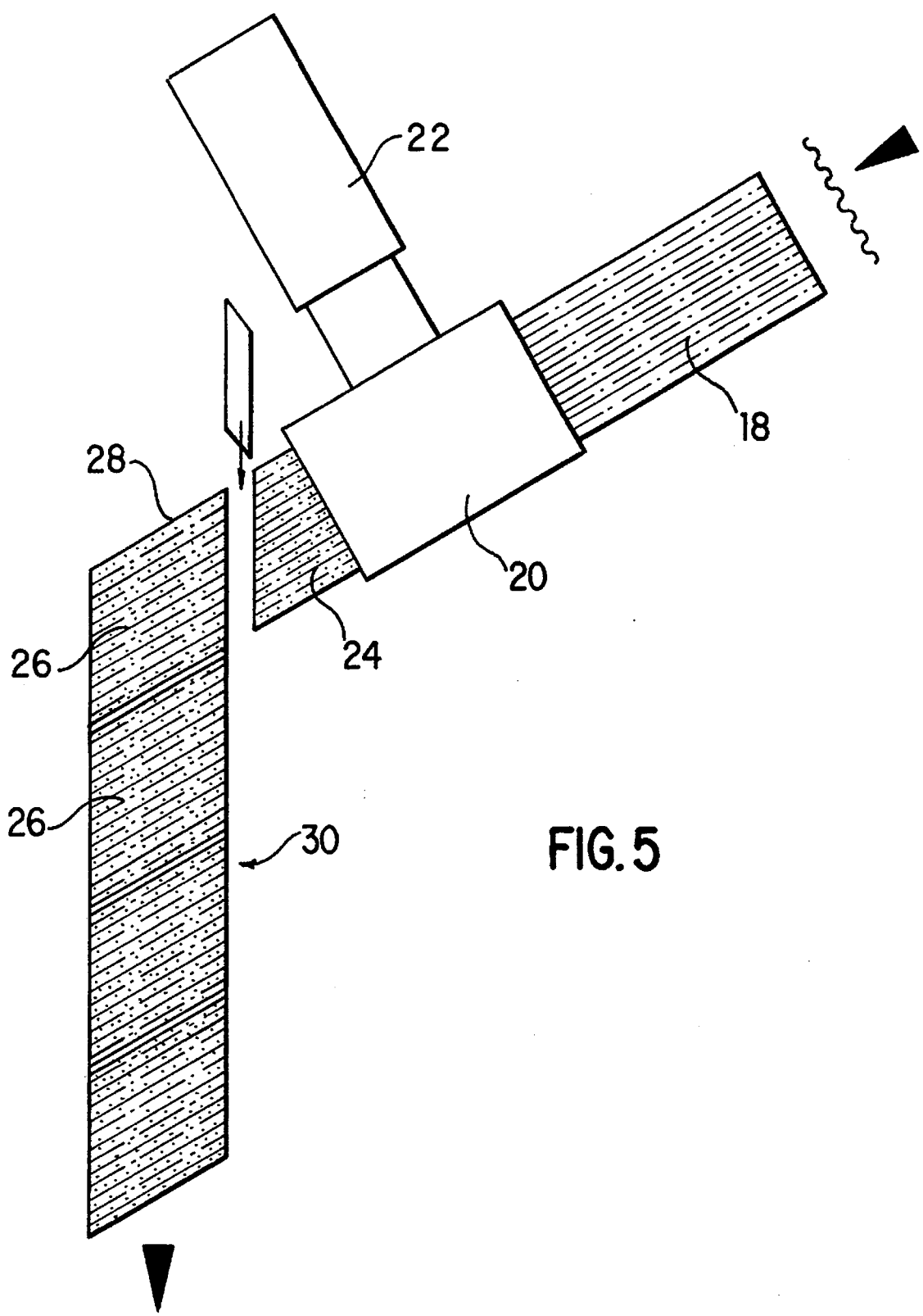
FIG. 5 is a schematic representation of a procedure for the manufacture of a layer with waved strengthening and stabilizing means.

The manufacture of a layer of a belt with strengthening and stabilizing means which have been worked in, possessing the form of foils or sheets whose waving or crimping elevations or depressions run obliquely, can be made with known procedures; for instance, by using calenderized foils or forming directly on a calender. However, an especially advantageous procedure is the schematically represented recommendation shown in FIG. 5. A strip 18 of a foil or of a sheet is inserted into the side head 20 of an extruder 22 whose waving or crimping elevations or depressions run in the direction of the entry of the side head and is coated on both sides. Should the occasion arise, the coating can extend at the side beyond the longitudinal edge of the strip, such that there develops a rim which juts out which is without foil or sheet. In order to enhance the bond between the foil or sheet and the coating material, it is possible to pre-treat these with a bonding agent.

Adjacent to the coating, the layered strips 24 are cut in single pieces 26, at an angle according to the designated course of the waving or crimping elevations or depressions, oblique to the circumferential direction A, of the tire, which can then be assembled on a layer 30 with their running edges 28 parallel to the crimping elevations or depressions.

With this procedure, one avoids the direct coating of a foil or sheet with oblique-running crimpage, which affords a list of advantages. Strips with longitudinally-running crimpages can be used as starting materials, which are easier and cheaper to produce than strips with oblique-running crimpage. There are, in addition, fewer sealing problems at the entry of a side head of the extruder, because the cross section of the strip, which needs to be sealed, does not change at the entry. And finally, by this means, there is a better command and optimization of the physical structure of the material's framework, as, for example, with the orientation of the atomic structure.

It is explicitly emphasized that the drawn and described embodiments of the invention merely show examples, which could be modified in various forms by a specialist within the scope of the invention concepts as defined by the claims. Thus, it would additionally be possible, for example, to add cord threads for use as strengthening and stabilizing means to at least one layer with waved or crimped foils or sheets. Furthermore, it could be an advantage, in certain cases, to provide the foils or sheets with apertures, or even to arrange them differently with or without varying their number, shape or size.

An additional longitudinal belt, for example, made of cord threads, to enhance the longitudinal stability is, in general, not necessary for tires with a construction which is based on this invention. Nevertheless, it must be kept in mind, that such an additional longitudinal belt is within the scope of the present invention. An additional longitudinal belt may be placed underneath, above, or on the sides of the belt which is based on this invention.

The main area of utilization of the tire of the present invention is street and commercial vehicles. However, it is not excluded that a tire based on this invention could also be employed for rail vehicles, such as underground railways, monorails, etc.

I claim:

1. Tires for vehicles comprising a body including at least one carcass, a tread, and a ring-shaped belt in a region under the tread, said ring-shaped belt including at least two strengthening layers including sheet material as strengthening and stabilizing means, said sheet material being either foils or sheets, said sheet material being embedded in elastomeric material and contiguously extending in a circumferential direction, said strengthening layers overlying each other in at least one area, said foils or sheets possessing direction-dependent mechanical characteristics presenting a highest value of rigidity in a preferred direction, and said foils or sheets being arranged such that the preferred direction is oblique to the circumferential direction.

2. Tires, in accordance with claim 1, wherein the direction-dependent mechanical characteristics of the foils or sheets are attained through an anisotropy or a texture of the sheet material of the foils or sheets.

3. Tires in accordance with claim 1, wherein the direction-dependent mechanical characteristics of the foils or sheets are attained by a waving or crimping whose elevations or depressions run longitudinally in the preferred direction.

4. Tires, in accordance with claim 1, wherein a smaller of the supplemental angles formed by the preferred direction and the circumferential direction in each strengthening layer including said foils or sheets lies between 1° and 45°.

5. Tires, in accordance with claim 1, wherein the foils or sheets are composed of many lamellae-formed parts arranged in each individual strengthening layer directly apposed to each other or overlapped with each other.

6. Tires, in accordance with claim 1, wherein the strengthening and stabilizing means of all strengthening layers are said foils or sheets whose rigidity attains its highest value in a preferred direction.

7. Tires, in accordance with claim 1, wherein the strengthening and stabilizing means of at least one of the at least two strengthening layers include cord threads.

8. Tires, in accordance with claim 1, wherein the strengthening and stabilizing means of at least two of the at least two strengthening layers are said foils or sheets, whose rigidity attains its highest value in a preferred direction, and the foils or sheets in each strengthening layer are arranged such that the preferred direction of one of these layers runs mirrored to the preferred direction of the other strengthening layer, with respect to the middle plane of the tire.

9. Tires, in accordance with claim 1, wherein the foils or sheets have apertures.

10. Tires, in accordance with claim 1, wherein the foils or sheets are metal.

11. Tires, in accordance with claim 1, wherein the foils or sheets are steel.

12. Tires, in accordance with claim 1, wherein the foils or sheets are synthetic material.

13. A tire for use in vehicles, comprising:

a carcass;

a ring-shaped belt surrounding said carcass;

a tread on an external surface of said belt;

said belt including a first and a second strengthening layer each consisting of strengthening and stabilizing means embedded within elastomeric material extending in a circumferential direction and overlying each other in at least one area;

at least one of said first and second strengthening layers including sheet material as strengthening and stabilizing means, said sheet material being either a sheet or a foil, said sheet material being contiguously arranged around said belt;

said sheet material possessing direction-dependent mechanical characteristics presenting a highest value of rigidity in a preferred direction; and said sheet material in said at least one of said first and second strengthening layers being oriented with said preferred direction being oblique to said circumferential direction.

14. The tire according to claim 13, wherein a smaller of the supplemental angles formed by said preferred direction and said circumferential direction in each said strengthening layer including said sheet material lies between 1° and 45°.

15. The tire according to claim 13, wherein at least one of said first and second strengthening layers includes cord threads as strengthening and stabilizing means.

16. The tire according to claim 13, wherein;

said first and second strengthening layers both include said sheet material as strengthening and stabilizing means;

said preferred direction of the sheet material of said first strengthening layer is oriented in mirrored relationship with the orientation of said preferred direction of the sheet material of said second strengthening layer, with respect to a middle plane of said tire.

17. The tire according to claim 13, wherein the sheet material of at least one of said first and second strengthening layers defines a plurality of apertures formed therethrough.

18. The tire according to claim 13, wherein said sheet material is metal.

19. The tire according to claim 18, wherein said metal is steel.

20. The tire according to claim 13, wherein said sheet material is synthetic material.

21. A tire for use in vehicles, comprising:

a carcass;

a ring-shaped belt surrounding said carcass;

a tread on an external surface of said belt;

said belt including a first and a second strengthening layer each consisting of strengthening and stabilizing means embedded within elastomeric material extending in a circumferential direction and overlying each other in at least one area;

at least one of said first and second strengthening layers including sheet material as strengthening and stabilizing means, said sheet material being either a sheet or a foil;

said sheet material possessing direction-dependent mechanical characteristics presenting a highest value of rigidity in a preferred direction;

said sheet material in said at least one of said first and second strengthening layers being oriented with said preferred direction being oblique to said circumferential direction; and said sheet material being composed of many lamellae-formed parts arranged in direct apposition to each other in each of said at least one of said first and second strengthening layers.

22. The tire according to claim 21, wherein said lamellae-formed parts include crimpage running longitudinally in said preferred direction.

23. A tire for use in vehicles, comprising:

a carcass;

a ring-shaped belt surrounding said carcass;

a tread on an external surface of said belt;

said belt including a first and a second strengthening layer each consisting of strengthening and stabilizing means embedded within elastomeric material extending in a circumferential direction and overlying each other in at least one area;

at least one of said first and second strengthening layers including sheet material as strengthening and stabilizing means, said sheet material being either a sheet or a foil;

said sheet material possessing direction-dependent mechanical characteristics presenting a highest value of rigidity in a preferred direction;

said sheet material in said at least one of said first and second strengthening layers being oriented with said preferred direction being oblique to said circumferential direction; and said direction-dependent mechanical characteristics of said sheet material being attained through an anisotropy of said sheet material.

24. A tire for use in vehicles, comprising:

a carcass;

a ring-shaped belt surrounding said carcass;

a tread on an external surface of said belt;

said belt including a first and a second strengthening layer each consisting of strengthening and stabilizing means embedded within elastomeric material extending in a circumferential direction and overlying each other in at least one area;

at least one of said first and second strengthening layers including sheet material as strengthening and stabilizing means, said sheet material being either a sheet or a foil;

said sheet material possessing direction-dependent mechanical characteristics presenting a highest value of rigidity in a preferred direction;

said sheet material in said at least one of said first and second strengthening layers being oriented with said preferred direction being oblique to said circumferential direction; and said direction-dependent mechanical characteristics of said sheet material being attained through a texture of said sheet material.

25. A tire for use in vehicles, comprising:

a carcass;

a ring-shaped belt surrounding said carcass;

a tread on an external surface of said belt;

said belt including a first and a second strengthening layer each consisting of strengthening and stabilizing means embedded within elastomeric material extending in a circumferential direction and overlying each other in at least one area;

at least one of said first and second strengthening layers including sheet material as strengthening and stabilizing means, said sheet material being either a sheet or a foil;

said sheet material possessing direction-dependent mechanical characteristics presenting a highest value of rigidity in a preferred direction;

said sheet material in said at least one of said first and second strengthening layers being oriented with said preferred direction being oblique to said circumferential direction; and said direction-dependent mechanical characteristics of said sheet material being attained by one of a waving and a crimping, the elevations and depressions of which run longitudinally in the preferred direction.

26. A tire for use in vehicles, comprising:

a carcass;

a ring-shaped belt surrounding said carcass;

a tread on an external surface of said belt;

said belt including a first and a second strengthening layer each consisting of strengthening and stabilizing means embedded within elastomeric material extending in a circumferential direction and overlying each other in at least one area;

at least one of said first and second strengthening layers including sheet material as strengthening and stabilizing means, said sheet material being either a sheet or a foil;

said sheet material possessing direction-dependent mechanical characteristics presenting a highest value of rigidity in a preferred direction;

said sheet material in said at least one of said first and second strengthening layers being oriented with said preferred direction being oblique to said circumferential direction;

said sheet material being composed of many lamellae-formed parts arranged either in direct apposition to each other or with a distance between them, in each of said at least one of said first and second strengthening layers; and said lamellae-formed parts include waving or crimping running longitudinally in said preferred direction.

\* \* \* \* \*